Patented Sept. 6, 1949

UNITED STATES PATENT OFFICE 2,481,122

PROCESS OF PREPARING DEHYDRATED MASHED POTATOES

Charles W. Kaufman, Tenafly, Hovey M. Burgess, Dumont, and Frank Hollis, Jr., Weehawken, N. J., assignors to General Foods Corporation, New York, N. Y., a corporation of Delaware No Drawing. Application November 15, 1945, Serial No. 628,972

2 Claims. (Cl. 99—207)

This invention relates to the preparation of dehydrated mashed potatoes, which usually are made from white potatoes (Solanum tuberosum). However, the invention may be applied to potatoes in general including sweet potatoes.

The desirability of dehydrated mashed potatoes which can be reconstituted for consumption by adding water (with or without milk, butter, etc.) has been appreciated for many years. Various methods of preparation of such a product have been proposed and some of such products have been widely used especially by the military services during the recent war. Nevertheless such products have not been satisfactory because the reconstituted mashed potatoes, while edible, have failed in substantial respects to equal freshly prepared mashed potatoes of good quality.

It is known that in the preparation of such a product and particularly in cooking and mashing, it is necessary for good results to avoid substantial damage to the potato cells. The cell walls enclose starch granules which swell up and burst under the influence of heat and moisture, the starch within the cells thus being "gelatinized." Proper mashing dissociates these cells either as individuals or as very small aggregates to produce a product that can be described as mealy, granular, or crystalline, and this condition is necessary if the product is to be dried and then reconstituted into mashed potatoes of good quality. At the same time this necessary condition must be attained without substantial damage to the cell walls by cooking, mashing, or otherwise, since the gelatinized starch would thereby be released and the reconstituted product would likely be a glutinous or pasty mass wholly unlike well prepared mashed potatoes from the standpoint of texture and palatability.

It has also been observed that during drying the mashed product often shrinks into a hard, horny mass which can be rehydrated only slowly and with much difficulty, and which tends to reconstitute into starch paste rather than mashed potatoes. These effects are aggravated by improper mashing as mentioned above, but the same tendency exists even where mashing is carefully performed. This is apparently due to cell damage resulting from shrinkage during drying or from overheating which induces further cooking, or from both causes.

To minimize the above effects, the mashed product has usually been dried in the form of shreds or filaments. However, the shreds or filaments have dried unevenly, portions of the dried shreds being more or less porous while other portions are hard, horny and discolored and rehydrate so slowly that dark lumps are found in the reconstituted product. In an effort to avoid this undesirable result, it has been proposed to maintain the mash in a finely divided state during dehydration by vigorous stirring, and even to subject the mash to mechanical disintegration in a hammer mill during dehydration, but these procedures cause objectionable cell damage.

We have found that uneven drying of the shredded mash is the result largely of lack of uniformity and homogeneity in composition. The potato varies in composition from point to point and when sliced, cooked and riced or otherwise mashed by usual procedures, similar differences in composition exist from point to point in the mash and in the shreds. It appears that these differences in composition, particularly with respect to protein and starch distribution, cause the uneven drying with resulting production of shreds of different characteristics. This is evidenced by the following comparison between light, porous shreds and shrunken, dense glassy or horny shreds, all processed from the same raw potatoes:

|  | Moisture | Starch | Protein | Sugar |
| --- | --- | --- | --- | --- |
| Light | 5.53 | 72.4 | 6.92 | 4.34 |
| Shrunken | 5.85 | 65.6 | 10.46 | 4.90 |

Hence one of the objects of the present invention is to provide complete or substantially complete homogeneity throughout the mash prior to ricing, extruding or other shred-forming treatment and subsequent drying. Thus variations in the characteristics of the dried product are minimized if not completely eliminated, and a reconstituted product of uniform, non-lump texture and consistency is obtained.

Another object is to obtain the substantially complete separation and thorough mixing of the cells which is necessary for such homogeneity without substantial damage to the cell walls.

Further objects are to dry the shredded or riced product rapidly without cell damage or scorching, toasting or the like, and to provide a dried product that can be reconstituted very quickly and easily.

We have found that the above results can be secured by beating or whipping the mash before ricing with incorporation in it of a relatively large amount of air, together with rapid drying of the aerated, riced product. Liquids such as milk or water can also be added prior to ricing if desired, although the liquid addition is not necessary. This whipping, aided by the incorporation of air (and liquid if used), results in the separation and mixing of the cells to produce a homogeneous mash with resultant uniform drying throughout, so that rehydration takes place uniformly and a non-lumpy homogeneous product is obtained.

Moreover, the porous nature of the aerated mash minimizes cell damage due to shrinkage during drying, and cooperates with rapid drying to produce a light porous dry structure which can be reconstituted quickly and easily. Heretofore the usual procedure has been to dry at relatively low temperatures to avoid overheating and further cooking with consequent cell damage, and this procedure has increased the tendency of the shreds to shrink into dense masses that rehydrate slowly. Due to the porosity of the aerated mass, however, the shreds can be dried rapidly in a current of air heated to a relatively high temperature, as the time required is short and the temperature in the shreds themselves does not reach a point at which damage occurs. Such rapid drying has a further important beneficial effect in substantially eliminating this tendency toward shrinkage. The outer surfaces of the shreds are dried rapidly and become rigid against collapse, and while there is some shrinkage of the inner material, it is limited in extent and takes place outwardly. The result is an enlarged, distinctly tubular shell having a fairly thick but highly porous wall, and the water of rehydration penetrates to all portions of the material practically immediately upon submergence of the dried shreds.

The invention is described in greater detail hereinafter in connection with examples of its practical application, but it is to be expressly understood that these examples are only for purposes of illustration and are not to be construed as a definition of the limits of the invention, reference being had to the appended claims for this purpose.

The potatoes are first thoroughly washed and peeled in any suitable way and thereafter are preferably sliced into comparatively small pieces (e. g., ⅜ inch slices) for more uniform gelatinization of the starch.

Cooking may be carried out by any suitable method which will not damage the potato cells, the preferred method from the standpoint of convenience being immersion in boiling water. With slices of the size mentioned above about 12 minutes cooking is required. If desired, however, the potatoes may be steamed provided care is taken to keep the temperature of the steam at approximately 212° F. Even pressure cooking is permitted provided the pressure of the steam is gradually reduced as cooking proceeds and is caused to become atmospheric by the time cooking is completed. Cooking by steam has the advantage of reducing the loss of albumen and other solubles, but the disadvantage of retaining free starch formed at the surface of the potatoes. Whether boiling, steaming, or any other method is employed, cooking should be continued until the potatoes are completely cooked throughout and just begin to disintegrate, but should not be carried to the point where the starch begins to coalesce as a result of overswelling and bursting of the cells.

The cooked potatoes are then subjected to mashing in the form of a mixing and whipping operation which achieves a dissociation of the potato cells either as individuals or as very small aggregates of the same, an intimate admixture of such individual cells and discrete aggregates with one another, and a copious introduction of air and its uniform distribution throughout the mash. As pointed out above, all three of these results are prerequisites of the desired characteristics of the final product.

This mashing operation may be carried out in any convenient type of mixing apparatus, but the mixing speed and mixing period should be carefully selected so as to obtain the aforementioned results and yet avoid material damage to the potato cells. The amount of air which needs to be introduced is no greater than that supplied by mixing at ordinary speeds, but in general it will be preferred to operate the mixing apparatus at the highest speed permissible with the view to reducing the mixing period to a minimum.

If desired, the mash obtained in the foregoing manner may subsequently be admixed with appropriate quantities of liquid to further minimize cell damage during dehydration and further improve the rate of rehydration on reconstitution. Besides water, liquids containing non-fat solids in suspension or solution may be used provided they are of a nature to be used in mashed potatoes, such as skim milk, water containing casein, and water containing lactose, and the expression "compatible aqueous liquids containing non-fat solids" as used in the claims includes all such liquids. Skim milk is preferred from the standpoint of imparting better keeping qualities to the final product. Whatever liquid is employed, the separation between cells is increased by the liquid and, in view of this presence of liquid between cells, additional air is introduced into the mash during the liquid admixing operation. On the other hand, when liquids of the type containing non-fat solids are employed, these effects are somewhat more pronounced than with the case of plain water apparently because the cells become coated with these solids during dehydration. Whatever liquid is employed, it should of course be added in quantities insufficient to prevent further processing. Moreover, the liquid must be added after mashing. If added before mashing, the cells can not be properly dissociated from one another without material damage to the same.

In ricing or extruding the mash, it is important that the filaments or shreds be of sufficient size to prevent appreciable cell damage during passage through the shaping perforations. The minimum permissible size of shred will vary somewhat with the type of extruding apparatus, but will generally be of the order of $\frac{1}{16}$ of an inch diameter. Filaments of greater size may be used, but from a practical standpoint should not exceed about ¼ of an inch diameter.

The extruded shreds are dried under such conditions that moisture is removed from their surfaces at a rate sufficiently faster than it can diffuse from their interiors as to set them substantially in their extruded size. In other words, the outer surfaces of the shreds must have moisture removed at a sufficiently rapid rate as to be made rigid against collapse throughout dehydration. Under these conditions the shreds will shrink outwardly away from their centers enough to assume a distinctly tubular form, but at the same time a relatively thick highly porous tubular wall or shell is formed without cell damage because of the separation between cells and aeration of the mash prior to dehydration.

Broadly speaking, the drying of the shreds may be carried out in any manner which will insure the aforementioned drying results. We prefer, however, to dry as rapidly as possible and, in practice, have found it satisfactory to first deposit an interlacing open mass of filaments by extrusion on a supporting screen and thereafter circulate relatively dry heated air at high velocity, e. g., at a rate of the order of from 150 to 300 linear feet per minute, through the mass of filaments carried on the screen. When drying by this method, air drying temperatures from 180° F. to as high as 280° F. may be used without causing bursting of the cells or exterior damage to the filaments such as scorching. In view of the rapidity of the drying, the filaments do not even begin to approach the critical temperature at which further cooking is initiated, which is believed to be well below 212° F. The filaments may be dried in from 10 to 30 minutes depending on the depth of the layer deposited on the screen.

In general, it will be desirable to dry the filaments to a moisture content of from 3 to 7%, the optimum range being from 3 to 5%. If dried into an interlacing mass of filaments, the product may thereafter be broken up into smaller masses of the same character or, if desired, subjected to appropriate mechanical treatment for separation into individual filaments or small aggregates of the same.

*Example*

16 pounds of common white potatoes were thoroughly washed and then peeled in a small abrasive peeler. All remaining eyes, bruises and other defects were removed by hand and the potatoes sliced to 3/8" in thickness to facilitate even cooking. About 12 pounds of the slices were obtained which were then put into about 7 gallons of boiling water in a steam jacketed aluminum tilt-kettle. The slices were boiled from 12–14 minutes or until they had just started to disintegrate. (In ordinary practice it is customary to cook until done but still firm.) The water was drained off and the potatoes transferred to a 12 qt. Hobart mixer and beat or whipped at the number 2 speed (120 R. P. M.) for about 2 minutes until the lumps were thoroughly broken down. The potatoes were then extruded by pressing with a wooden plunger through a 10 gauge plate of perforated metal having 1/8" holes on 3/16" centers (about 40% open area), onto a screen tray covered with 30 mesh stainless steel hardware cloth, to a depth of from 1/2–3/4 inch. The shreds of potato resulting from this extrusion were of very random orientation, more or less intertwined. This tray with the extruded shreds was then placed in a Proctor & Schwartz drier and dried for 11–12 minutes with an air velocity of about 200 linear ft. per minute downward through the bed. The temperature of the air was 220° F. dry bulb and about 100° F. wet bulb. After drying the product was broken down into agglomerates about 1" x 1" x 1/2" or could be further broken down into individual shreds. About 2 1/4 pounds of the dried material was obtained.

After the above mixing operation one pint of liquid skim milk can be added to the whipped mash and mixing or whipping then continued for another minute.

The product thus obtained comprises shreds uniformly white in color and of very light highly porous texture with hollow centers (i. e., tubular). The walls of the shreds or filaments consist of the original potato cells in substantially undamaged condition but uniformly admixed with one another by the whipping operation described above so that the protein and starch content of the original material is uniformly distributed and the composition of the shreds is homogeneous throughout. As a result of these conditions the shreds dry uniformly without forming the hard, horny discolored masses characteristic of prior products.

The above product embodying the invention can be rehydrated practically instantaneously and without lumps. For example, 2 cups boiling water, 1 teaspoon salt, 1 tablespoon butter and 2 tablespoons milk are heated together in a saucepan and then added to 4 ounces of the dehydrated shreds, the shreds being pressed rapidly into the water. The ingredients are then stirred until thoroughly mixed and beaten until light and fluffy. If softer consistency is desired, a little more milk can be added.

In large scale commercial practice, it may be desirable to dry continuously on a moving conveyor. The layer of shreds can be loaded to a depth of three inches or more and dried in stages, for example, 240° F. downdraft, 180° F. downdraft, and 190° F. updraft, the overall time required being about thirty minutes.

It will be understood that the above examples are for purposes of illustration and that the invention is not restricted thereto nor to the various details set forth in the specification. Reference should be had to the appended claims for a definition of the limits of the invention.

What is claimed is:

1. A process of preparing dehydrated mashed potatoes which comprises cooking the potatoes and draining off any free liquid, whipping the cooked potatoes in the absence of free liquid to thoroughly dissociate and intimately mix the cellular material and form an aerated mash consisting of potato substance having mealy uniform texture with the potato starch and protein homogeneously distributed throughout, forming the mash into filaments, and drying said filaments by circulating air at a temperature within the approximate limits of 180° F. and 280° F. therethrough at a rate of the order of 150–300 linear feet per minute, thereby setting the filaments substantially in their predried size and producing tubular porous dried shreds.

2. A process as defined in claim 1 wherein a liquid of the group consisting of water and compatible aqueous liquids containing non-fat solids is added to said mash after whipping and the mash and liquid are further whipped before being formed into filaments.

CHARLES W. KAUFMAN.
HOVEY M. BURGESS.
FRANK HOLLIS, Jr.

REFERENCES CITED

The following references are of record in the file of this patent:

UNITED STATES PATENTS

| Number | Name | Date |
|---|---|---|
| 727,585 | Bunyan | May 12, 1903 |
| 2,120,777 | Dalsey | June 14, 1938 |
| 2,185,451 | Webb | Jan. 2, 1940 |
| 2,381,838 | Rendle | Aug. 7, 1945 |

OTHER REFERENCES

"The American Woman's Cook Book," 1945, by Ruth Berolzheimer, published by Consolidated Book Publishers, Chicago, page 408, article entitled "Mashed Potatoes."